Oct. 29, 1957   J. LATZEN   2,811,377
BALL AND SOCKET JOINT
Filed Aug. 5, 1950
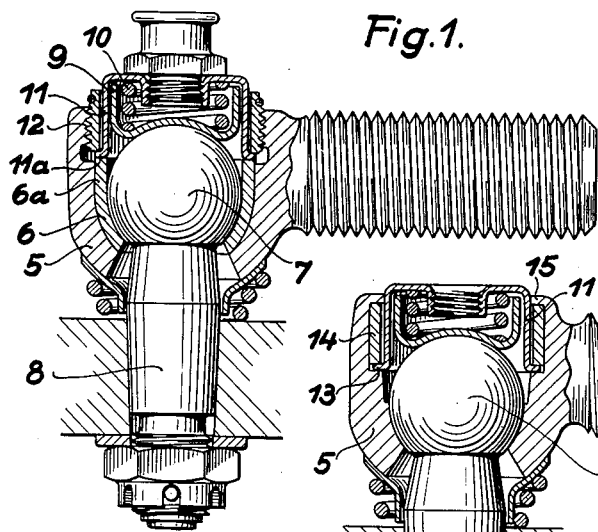
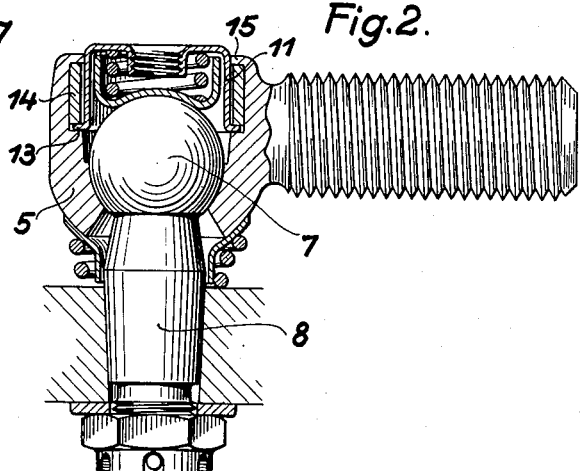
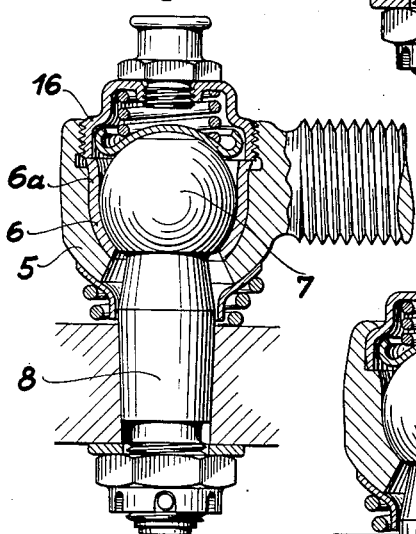
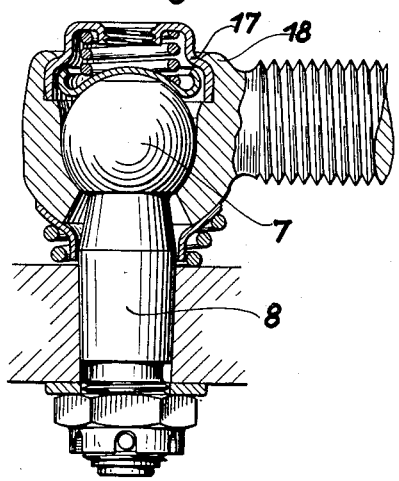
INVENTOR
Josef Latzen
BY
Jerome W. Paxton

United States Patent Office 2,811,377
Patented Oct. 29, 1957

2,811,377
BALL AND SOCKET JOINT

Josef Latzen, Dusseldorf-Oberkassel, Germany

Application August 5, 1950, Serial No. 177,843
In Germany October 1, 1948

Public Law 619, August 23, 1954
Patent expires October 1, 1968

1 Claim. (Cl. 287—90)

The present invention relates to a ball and socket joint having a ball seat provided in the case of the joint, the joint being used for steering rods of motor cars and the like. The ball head of such joints has some play in the direction of the axis, which is compensated for elastically by a spring. With joints of a simple construction the ball head is supported directly in the case of the joint which was formed either in the end of the rod itself or on a threaded bolt. With other designs, a ball cup is first inserted into the case for the ball head to cooperate with. The disadvantage of the known joints is that the shape of the case and of the parts closing the joint vary according to whether the joint is provided with or without a ball cup.

It is an object of the present invention to simplify the construction of ball joints having a ball seat provided in their case. To this end the inventor suggests lengthening the ball cup by means of a cylindrical part which part extends above the middle of the ball head. In this way it is possible to fit into a joint having a ball cup the same parts for covering the joint and retaining the ball head as are used for joints without a ball cup, said parts having the advantage of being small in size and resting on said projecting part. The cap for closing the case may be pressed, by means of a pressure or screw ring against a projecting part in the case or against the edge of the projecting part of the ball cup.

The ball joints according to the invention allow the caps and rings both of joints with and without ball cups to retain one and the same short form, as the projecting part of the ball cup may easily be shaped correspondingly high.

Further objects and advantages of the present invention will be apparent from the following description, reference being had to the accompanying drawing wherein a preferred embodiment of the present invention is clearly shown.

Figures 1–4 are longitudinal sections of ball joints according to the invention.

Figure 1 illustrates a ball joint with a ball cup,

Figure 2 illustrates the invention without a ball cup,

Figure 3 illustrates another ball joint with a ball cup, and

Figure 4 illustrates a further form of the invention used without a ball cup in the case.

Figure 1 shows a joint in which a case 5 is provided with a ball cup 6, said cup being according to the invention provided with a cylindrical projecting part 6a extending above the middle of a ball head 7 of a ball pivot 8 and having a slightly bent over lip at the lower end. As is known in the art, a spring loaded metal disk 9 is disposed on the ball head 7, said disk being under the pressure of a spring 10 and allowing the ball head 7 to move somewhat in the direction of its axis. The case 5 is covered by a cap 11 manufactured as a drawn piece. The flanged edge 11a of the cap 11 is pressed on the projecting part 6a of the ball cup 6 by means of a screw ring 12 and retained in this way. The projecting part 6a offers the advantage that the cap 11 and the ring 12 may be small in size, and that the seat of the ball cup in the bore of the case is much improved. Moreover, the ball head is laterally guided when moving vertically.

In case the ball head 7 is seated directly in the case 5 without a ball cup being inserted as illustrated in Figure 2, it is according to the invention possible to use the same parts to hold in place the ball head 7, the cap 11 then resting on a stop 13 of the case 5. The cap may be fastened by means of a screw ring in the same manner as shown in Figure 1, but according to the invention it is also possible to insert a simple pressure ring 14 retained by a flange 15 of the case 5. In this way there will be obtained a non-detachable connection instead of the detachable screw connection. A simple ring 14 retained by a flange may as well be used for a ball cup according to Figure 1. The screw ring 12 or the pressure ring 14 are rolled out of a sheet iron strip. In this way, these parts can be manufactured economically and from little material.

According to Figures 3 and 4 the caps 16 and 17 respectively are pressed from iron sheet thicker than that used for the corresponding parts of Figures 1 and 2. The manufacture of said parts presents no difficulties because of their comparatively small drawing depth. To obtain a screw connection the lower part of the cap 16 is merely provided with a thread whereas the cap 17 according to Figure 4 is retained by a flange 18. Special pressure rings are therefore no longer required. For the rest, the design of the joints illustrated in Figures 3 and 4 corresponds to that of Figures 1 and 2.

The joints offer the advantage that same parts small in size may be used for joints of different kinds, which simplifies manufacture. Moreover, store keeping will be reduced considerably.

What I claim is:

A ball joint comprising a housing having a socket therein, the socket merging with an opening at each end of the housing, the openings being of different diameters, a ball cup lodged in said socket, a ball disposed in said cup, a shank on the ball extending through the opening of smaller diameter, the said cup being provided with a projection extending to a point beyond the middle of the said ball but within the limits of the ball periphery to constitute an annular abutment, a closure cap closing the opening of larger diameter, an annular flange on the closure cap disposed perpendicularly to the axis of the cap, corresponding to the axis through the open end of the socket resting on the annular abutment, a spring cup disposed within said closure cap provided with a wall conforming to the curvature of the ball, a spring located between the said spring cup and closure cap normally urging the spring cup against the ball, internal threads in the opening of larger diameter, and a ring having external threads lodged between the cap and the housing engaging the internal threads of the housing to press the annular flange against the annular abutment.

References Cited in the file of this patent

UNITED STATES PATENTS

| 1,951,197 | Milligan | Mar. 13, 1934 |
| 2,083,718 | Kull et al. | June 15, 1937 |
| 2,206,972 | Niles | July 9, 1940 |

FOREIGN PATENTS

| 134,709 | Great Britain | Nov. 13, 1919 |
| 131,172 | Switzerland | Apr. 1, 1929 |
| 582,421 | Germany | Aug. 15, 1933 |
| 630,181 | Germany | May 22, 1936 |
| 852,478 | Germany | Oct. 16, 1952 |